(No Model.)
B. F. DINGLEY.
MEAT CLAMP.
No. 307,105. Patented Oct. 28, 1884.
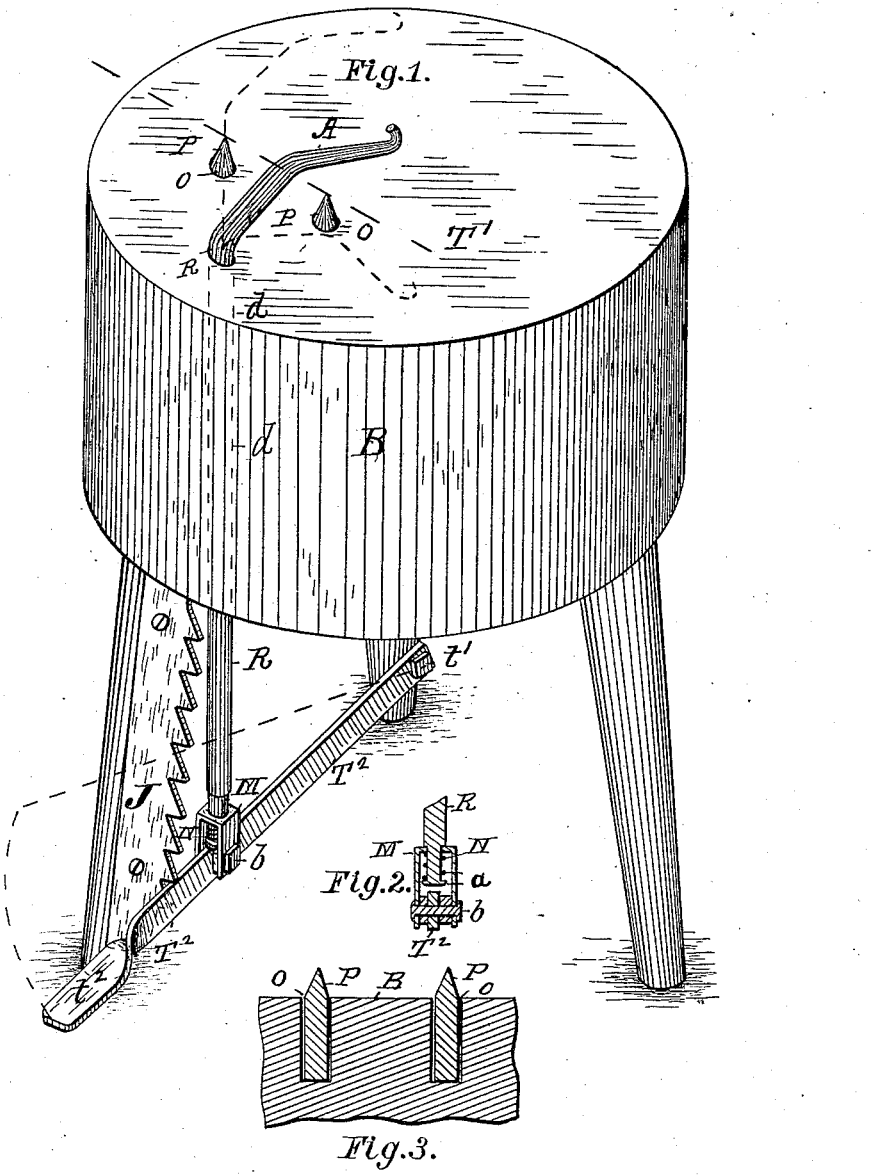
Witnesses:
Charles S. Brintnall
Geo. F. Hyde
Inventor:
Benjamin F. Dingley
by W. E. Hagan his Atty

UNITED STATES PATENT OFFICE.

BENJAMIN F. DINGLEY, OF COHOES, NEW YORK.

MEAT-CLAMP.

SPECIFICATION forming part of Letters Patent No. 307,105, dated October 28, 1884.

Application filed March 18, 1884. (No model.)

*To all whom it may concern:*

Be it known that I, BENJAMIN F. DINGLEY, of the city of Cohoes, county of Albany, State of New York, have invented a new and useful Improvement in Meat-Clamps, of which the following is a specification.

My invention relates to a mechanical means designed for holding meat in a position to be cut when it is placed on a butcher's block, and the object of my invention is to enable the person engaged in cutting the meat or sawing its bone to do so without being compelled to hold the meat in position at the same time.

In the accompanying drawings, forming a part of this specification, there are three figures illustrating my invention, with the same designation of parts by letter reference used in all of them. Of these illustrations, Figure 1 shows a perspective of a butcher's block with my invention attached thereto. Fig. 2 shows a section taken vertically through the lower end of the holder-rod and the treadle-lever by which the holder is operated. Fig. 3 represents a section taken through a part of the block in which there are placed movable staying-pins that are made with pointed ends.

The several parts of the mechanism and the parts of the block to which the former is attached are designated by letter reference and their function explained as follows:

The letter B designates the block, and T' its top surface.

The letter P indicates pins having pointed upper ends, and which pins are made to fit in holes O produced in the blocks with their pointed upper ends projected above the top of the block, and so constructed that they can be removed from the block when desired.

The letter A designates the holder-arm, and R the hollow rod which passes up through the block, as indicated by the dotted line $d$. This holder-rod at its lower end is pivoted into the top of the stirrup M, and its upper end is firmly secured to the arm A.

The letter $T^2$ designates a treadle-lever, which at one end, as indicated at $t'$, is pivoted to one of the legs of the block, and at its other end it is flattened out for the application of the foot, as indicated at $t^2$. This treadle-lever $T^2$ is connected to the rod R by means of the stirrup M, and it is pivoted in the latter by the bolt $b$, so that as the treadle-lever is pressed down by the foot the rod R and the connected arm A are also drawn down, the latter toward the block. On the pivot end of the rod R, and arranged between its cap $a$ and the stirrup-top, there is placed a spring, M, the function of which will be described subsequently.

The letter J designates a serrated rack that is attached to the sides of one of the legs of the block, the notches or teeth of this rack being adapted to receive and detain the treadle-lever when forced down under any one of them, the spring N allowing of a little elasticity to the adjustment when making the connection between the treadle and the rack-teeth.

As thus made the apparatus is operated as follows: A carcass or piece of meat being placed upon the top of block over the pointed pins, the arm A is then moved around into such a position as will best hold the meat to be cut or sawed. When this has been done, the treadle-lever is then forced down by the foot and the arm A pressed into the meat. Then the treadle-lever is passed under one of the teeth or notches, by which it is firmly held while the meat or carcass thus secured upon the block is being cut or sawed.

The rod R, to which the arm A is attached, being pivoted as before described, permits the arm to be swung from over the block when not in use; and the pins P, being movable, may be taken from the block when not used in connection with the other parts. While I have shown the rod R as passing up through the block, it can be made to operate in brackets from the side of the latter, and, if desired, teeth may be used on the under side of the arm. The meat to be cut permits the settling into it of the arm A when under pressure for the connection to be made between the treadle-lever and the teeth of the rack, thus allowing an adjustment for such connection, and hence the spring N may be omitted, if desired.

Having thus described my invention, what I claim, and desire to secure by Letters Patent, is—

1. The combination, with the block B, of the holder-arm A, the holder-rod R, rigidly connected to said arm, the treadle-lever $T^2$, the stirrup M, arranged on the latter and made with a pivotal opening for the lower end of the holder-rod, and the rack J, the said parts being constructed and arranged to operate in the manner as and for the purposes set forth.

2. The combination, with the block B, of the holder-arm A, the holder-rod R, connected to the former, the treadle-lever $T^2$, the rack J, and the removable pins P, the said parts being constructed and arranged to operate in the manner as and for the purposes set forth.

Signed at Troy, New York, this 15th day of March, 1884, and in the presence of the two witnesses whose names were by them hereto written.

BENJAMIN F. DINGLEY.

Witnesses:
CHARLES S. BRINTNALL,
C. H. SHEPARD.